Feb. 1, 1966   P. L. STONE   3,232,130
SPEED CHANGER FOR A RECORDER
Filed Sept. 13, 1963   3 Sheets-Sheet 1
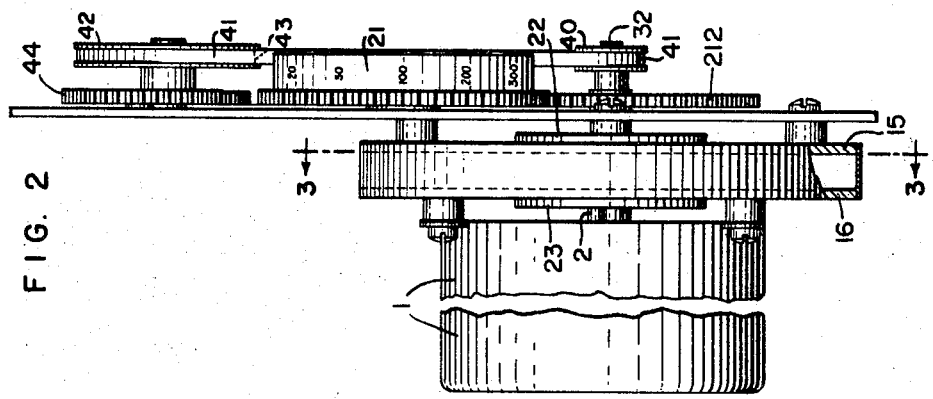
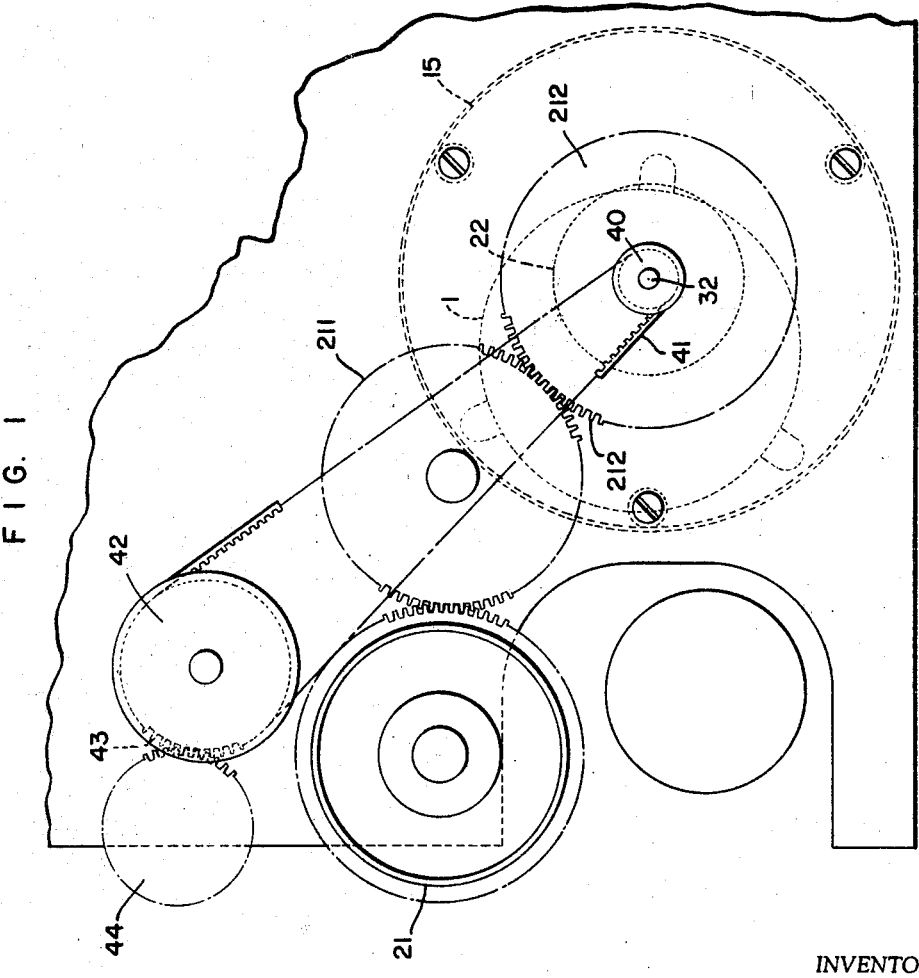
INVENTOR.
PAUL L. STONE
BY *Arthur H. Swanson*
ATTORNEY.

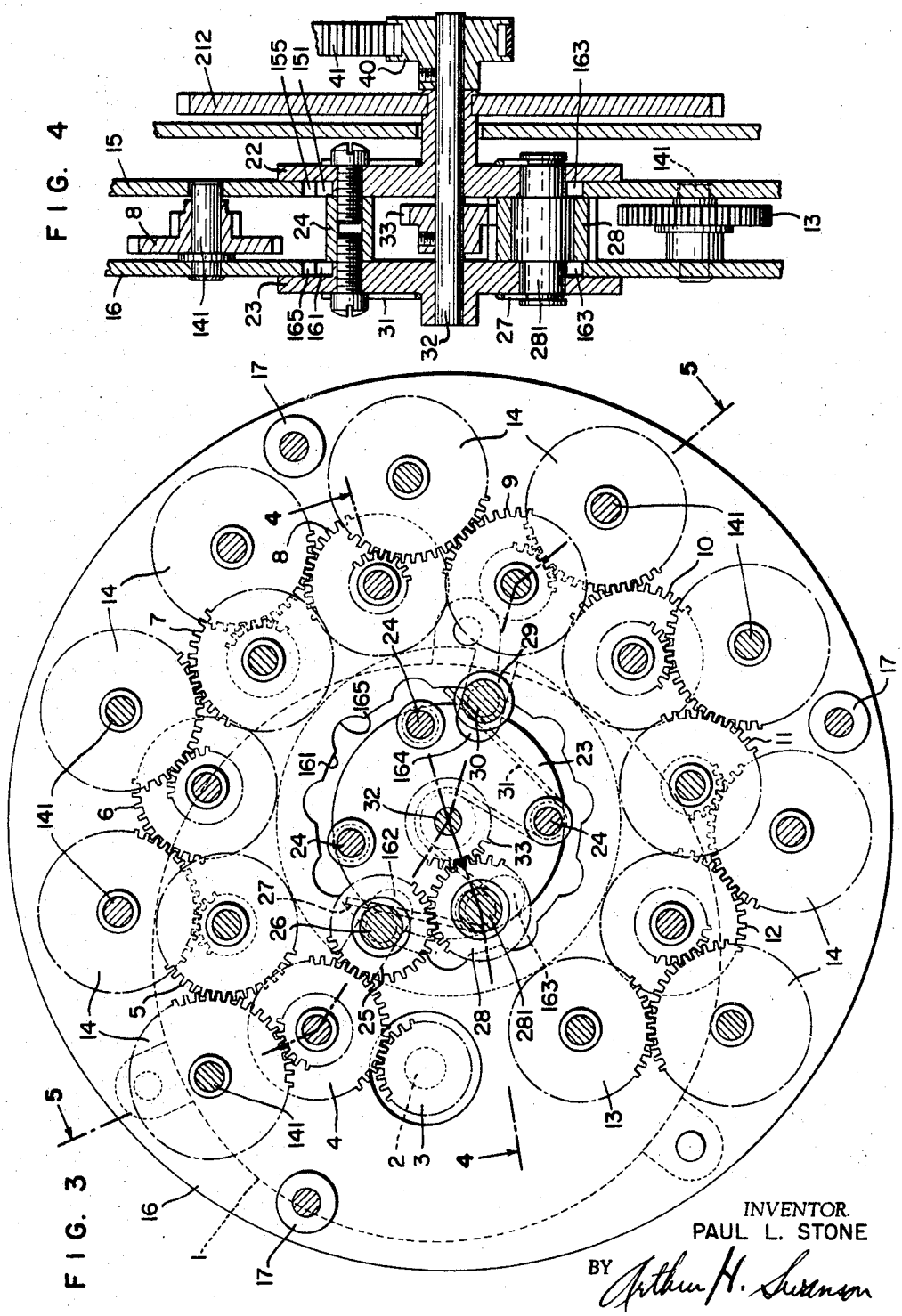

Feb. 1, 1966    P. L. STONE    3,232,130
SPEED CHANGER FOR A RECORDER
Filed Sept. 13, 1963    3 Sheets-Sheet 3

INVENTOR.
PAUL L. STONE
BY Arthur H. Swanson
ATTORNEY.

United States Patent Office 3,232,130
Patented Feb. 1, 1966

3,232,130
SPEED CHANGER FOR A RECORDER
Paul L. Stone, Meadowbrook, Pa., assignor to Honeywell Inc., a corporation of Delaware
Filed Sept. 13, 1963, Ser. No. 308,809
5 Claims. (Cl. 74—353)

This invention relates to means for driving a driven member at a selected one of a number of speeds.

These means comprise a drive pinion forming the input to the means, a train of drive gears each driven at a different speed by said drive pinion, a train of shift gears including an input shift gear adapted to mesh with a selected one of said drive gears and including an output shift gear, said shift gears being mounted so that the forces due to the torque applied thereto by said drive pinion tend to keep said shift gears in mesh with each other and in mesh with the selected one of said drive gears, means for moving said input shift gear out of engagement with one of said drive gears and for moving it in either direction into engagement with another one of said drive gears, and an output pinion driven by said output shift gear, said output pinion forming the output of said means.

It is an object of this invention to provide change speed gearing which is compact in size and efficient in operation.

It is a further object of this invention to provide change speed gearing including gears which are biased towards engaged position by the forces which the gears transmit.

An additional object of this invention is to provide change speed gearing having an output pinion which can be turned by hand. Such turning motion biases the intermediate shift gears towards disengaged position and does not cause the gearing to bind.

A better understanding of the present invention may be had from the following detailed description when read in connection with the accompanying drawings, in which:

FIG. 1 is a diagrammatic or schematic side elevation.

FIG. 2 is a front elevation of the mechanism shown in FIG. 1.

FIG. 3 is a cross section with parts broken away and on an enlarged scale on line 3—3 of FIG. 2 as viewed in the direction of the arrows.

FIG. 4 is a cross section on jagged lines 4—4 of FIG. 3 as viewed in the direction of the arrows.

This invention comprises means for driving a driven member, such as a strip chart of a recorder, at a selected one of a number of varying speeds.

Figure 5:
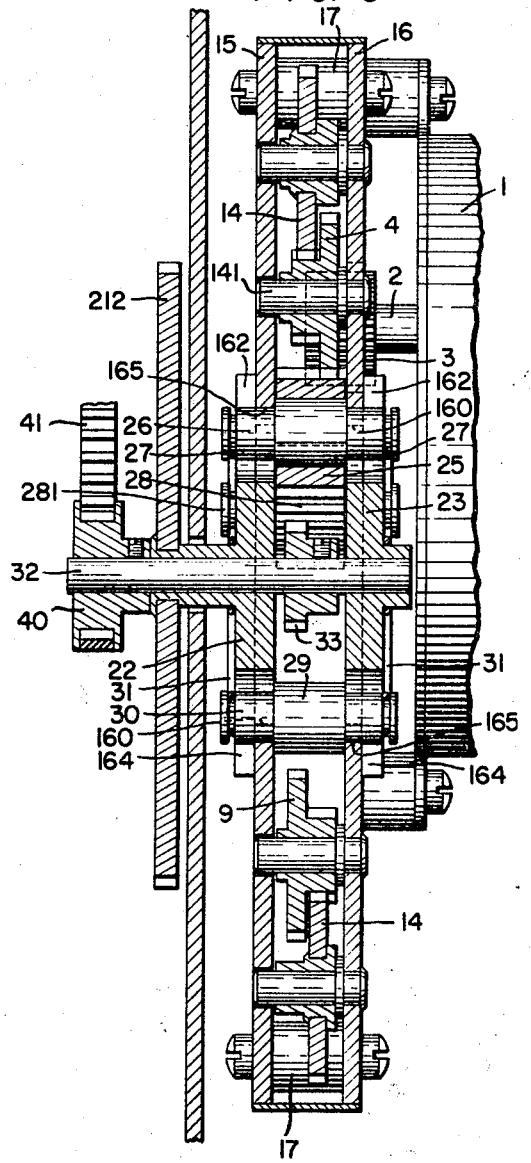
FIG. 5 is a cross section on jagged lines 5—5 of FIG. 3 as viewed in the direction of the arrows.

FIG. 5 shows drive motor 1 having drive shaft 2 projecting from it and drive pinion 3 mounted on drive shaft 2.

FIG. 3 shows that drive pinion 3 meshes with the first of a train of drive gears 4, 5, 6, 7, 8, 9, 10, 11, 12 and 13 each having a portion of its surface arranged in a line, in this case an arc of a circle. Each of the gears 4–13 is adapted to be driven in the same direction of rotation at a different, selected speed by drive pinion 3 because the gears 4–13 each may have a pinion on its hub meshing with one of a train of idler gears 14, each idler gear being located between a pair of drive gears. The idler gears 14 are each mounted on one of a plurality of separate supporting shafts 141.

The drive gears 4–13 must each turn at a different speed. Gears 4–13 must each rotate in the same direction.

Otherwise, the direction of rotation of the driven member would be the reverse of that desired. It is not essential to this invention how these requirements be obtained. It is essential that they be obtained.

The right hand case plate 15 and the left hand case plate 16 (FIG. 4) are held in parallel relationship by connectors 17 (FIG. 3). Case plate 15 has a circular hole 151 through its center. Case plate 16 has a circular hole 161 through its center. The edges of circular holes 151 and 161 have scallops 155 and 165 formed in the surface thereof, respectively. Scallops 155 and 165 interrupt but do not completely destroy the circular surfaces of the holes 151 and 161.

In circular hole 151 in case plate 15 is mounted shift plate 22. In circular hole 161 in case plate 16 is mounted shift plate 23. Shift plates 22 and 23 are connected together by connectors 24 (FIG. 4).

FIG. 1 shows the means for rotating shift plates 22 and 23. These means comprise a train of plate shift gears of which the opearting or input pinion is gear 21, meshing with gear 211, meshing with gear 212. FIGS. 4 and 5 show that gear 212 is connected to and is fast on shift plate 22 and forms part of means for rotating shift plates 22 and 23 in circular holes 151 and 161, respectively.

FIGS. 3, 4 and 5 show that shift plates 22 and 23 have mounted on them a train of shift gears comprised of input shift gear 25 mounted on shaft 26 and biased by spring 27 against the rim or edge of circular openings 151 and 161. Meshing with shift gear 25 is an idler shift gear 28 mounted on shaft 281 and meshing with output pinion 33 mounted on output shaft 32. A detent 29 is also mounted by means of shaft 30 on the shift plates 22 and 23 and is biased by spring 31 into engagement with a selected one of the scallops 155 and 165. Springs 27 and 31 are integral parts of a W-shaped spring whose center is trained around shaft 32.

Shift plates 22 and 23 have slots 162 in them into which project the ends of shaft 26. Shift plates 22 and 23 also have curved slots 163 in them into which project the ends of shaft 281. Shift plates 22 and 23 also have slots 164 in them into which project the ends of shaft 30 on which detent 29 is mounted.

FIGS. 1, 2, 4 and 5 show that shaft 32 has a notched pulley 40 mounted on it. Around pulley 40 is trained one bight of cleated belt 41 having a second bight trained around pulley 42 on which is mounted gear 43 meshing with gear 44 which forms the output of the device.

Figure 6:
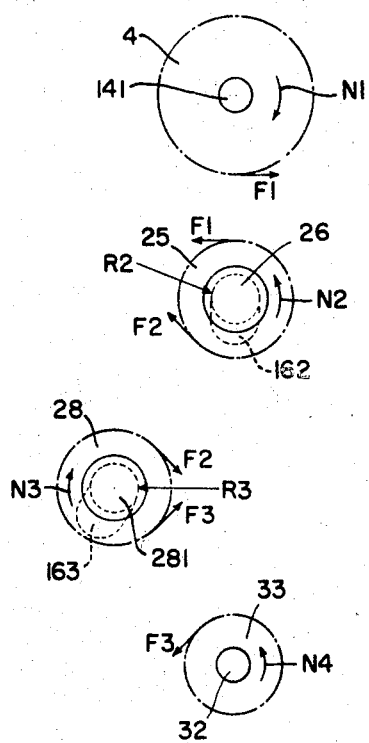
FIG. 6 is an equilibrium diagram useful in explaining the shift gear mechanism of the invention.

Gear 44 can be turned by hand to cause movement of the element, such as the strip chart of a recorder, which is driven by gear 44. Rotation of gear 44 rotates gear 43, belt 41, pulley 40 and shaft 32. Shaft 32 is normally driven in a counter-clockwise, as seen in FIGS. 1, 3 and 6. Manual rotation of shaft 32 in the clockwise direction tends to rotate gear 28 counter-clockwise and to force gear 28 to the lower end of slot 163 and out of engagement with gear 25. Counter-clockwise rotation of gear 28 tends to force shaft 26 to the lower end of slot 162 and to force gear 25 out of engagement with drive gear 4. Therefore, there is no tendency for the shift gears 25, 28 and 33 to bind and thus prevent movement of the output shaft 32 and the elements driven by shaft 32 in a clockwise direction reverse to the counter-clockwise direction in which output shaft 32 is normally driven.

The operation of the change speed gearing of this invention is as follows: When the gears are in mesh (as shown in FIG. 3), power is transmitted from motor 1 (FIG. 5), shaft 2 (FIG. 5) and input drive pinion 3 to gear 4 of the train of drive gears. All the other drive gears 4–13 are turning, each at a selected speed, because of the engagement of these gears with the idler gears 14.

Input shift gear 25 is in engagement with drive gear 4 and also in engagement with intermediate idler shift gear 28 which, in turn, is in mesh with output pinion 33 to which output shaft 32 and any mechanism which may be connected thereto is mounted.

FIG. 6 is a free body or equilibrium diagram which shows the forces applied to the gears by the torque or power transmitted thereby and the reaction to these forces. The diagram is drawn as though the gears and shaft were floating in space. It will be seen that these forces tend to push the gears into engagement or mesh with each other so that it is not necessary for springs 27 and 31 to transmit the torque transmitted by this gear train.

FIG. 6 shows that if a straight line be drawn connecting and passing through the axis of that shaft 141 on which drive gear 4 is mounted, passing through the axis of shaft 26, and passing through the axis of shaft 32, and if it be assumed that gear 4 is turning clockwise (as shown by arrow N1), it follows that gear 25 is turning counter-clockwise (as shown by arrow N2), gear 28 is turning clockwise (as shown by arrow N3), and output pinion 33 is turning counter-clockwise (as shown by arrow N4). Drive gear 4 applies torque to input shift gear 25 (as shown by arrow F1). Gear 25 applies torque to intermediate idler shift gear 28 (as shown by arrow F2). Gear 28 applies torque to output pinion 33 (as shown by arrow F3).

Arrow R2 represents the reaction of the scallops 155 and 165 on shaft 26 as a result of the forces represented by the arrows F1 and F2. Arrow R2 shows that the reaction to the forces applied by the torque to gear 25 mounted on shaft 26 is transmitted by the gear 25 and tends to force shaft 26 to the upper end of slot 162 against scallops 155 and 165 and to force gear 25 into engagement with drive gear 4. A row R3 shows that the reaction applied to gear 28 by torque transmitted by gear 28 tends to force gear 28 to the upper end of slot 163 and into engagement with gear 25.

Figure 7:
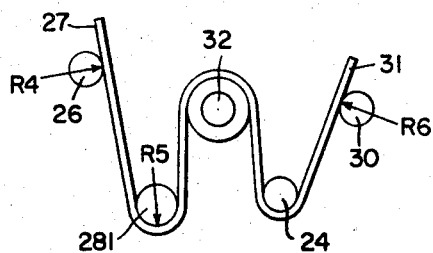
FIG. 7 is an equilibruim diagram useful in explaining the biasing spring mechanism of the invention.

FIG. 7 is a free body or equilibrium diagram which shows the forces applied to springs 27 and 31 and the shafts about which these springs are trained. Springs 27 and 31 are integral parts of W-shaped spring which abuts at one end against shaft 26 and which abuts at its other end against detent 30. The center of this spring is trained around rotatable shaft 32. The portion 31 is trained around stationary shaft 24 and bears against detent 30 so that the detent 30 reacts on the spring 31 with a force represented by the arrow R6.

The spring 27 is trained around movable shaft 281 and bears against shaft 26. Arrow R4 represents the reaction which the shaft 26 exerts against the free or movable end of spring 27. Spring 27 also exerts a force on movable shaft 281. The reaction of shaft 281 to this force is represented by the arrow R5. It will be appreciated that the springs 27 and 31 are compressed, as shown in the diagram. If the springs 27 and 31 were not compressed their free ends would be much more nearly horizontal, as seen in FIG. 7. In other words, the springs 27 and 31 are compressed into fairly narrow U's instead of fairly wide U's, as they would be if they were not compressed.

If it is desired to drive output shaft 32 at a different speed, plate shift gear 21 (FIG. 1) is turned by hand which causes gears 211 and 212 to rotate shift plates 22 and 23. This rotation of shift plates 22 and 23 causes slot 163 to actuate the ends of shaft 281 and to move idler gear 28 out of engagement with gear 25 and output pinion 33. The ends of shafts 26 and 30 can then be moved out of the scallops 155 and 165 in which they are located and moved in either direction so as to lodge into the next scallops or into succeeding scallops, at which time input shift gear 25 will mesh with a selected one of the drive gears 4–13. Since this drive gear is turning at a different speed than gear 4, the output shaft 32 will be turned at a different speed through the train of gearing outlined above.

What is claimed is:
1. A change speed gearing, including, a drive motor, a drive shaft projecting from said motor, a drive pinion mounted on said drive shaft, a case including a pair of rigid confronting plates each having a hole therethrough confronting the hole in the other plate and having a circular surface and scallops interrupting said circular surface, connectors holding said plates in spaced apart confronting relation, a plurality of supporting shafts each mounted in the same one of said plates and projecting through the other of said plates, a train of drive gears each mounted on one of said supporting shafts between said plates and each having a portion of its driving surface arranged in a line with a portion of the driving surface of the others of said train of drive gears, a plurality of idler gears each mounted on one of said supporting shafts and located between said plates and each meshing with a pair of said drive gears so that the drive gears and said idler gears form a train each gear of which rotates at a different speed, the first of said drive gears meshing with said drive pinion so as to be driven thereby, and means for changing the output speed of said gearing, including, an operating pinion adapted to be rotated manually, a pair of rigid confronting shift plates connected to said operating pinion so as to be rotated thereby and mounted in the circular surfaces of the holes in said case plates for rotation therein and having a plurality of slots therethrough, said slots being arranged in confronting pairs in each of said shift plates, and means connecting said operating pinion to each of said shift plates so that rotation of said operating pinion rotates said shift plates, input shift gear adapted to be moved in either direction into mesh with each of said drive gears in succession, a shaft mounting said input shift gear on said shift plates in a pair of said slots so that said input shift gear is movable radially of said input shift plates, an input spring biasing said input shift gear shaft into successive engagement with each of said scallops or with a portion of the surface of said circular holes, an idler shift gear meshing with said input shift gear, a shaft mounting said idler shift gear in a pair of said slots for moving transverse to the radius of said shift plates, an idler spring biasing said idler shift gear toward one end of its path of travel, an output shaft mounted for rotation in said shift plates, and an output pinion mounted on said output shaft and meshing with said idler shift gear so as to be rotated thereby and to rotate said output shaft, said input shift gear and said idler shift gear being arranged so that the reaction torque on said gears due to the torque applied to said gears by that one of the drive gears with which said input shift gear is in mesh is in a direction biasing each of said gear shafts on which each of said gears is mounted towards the end of the slot in which said gear shaft is mounted whereby said input shift gear is driven against a selected one of said drive gears when said drive gear is driven in one direction and whereby said input shift gear is driven away from said selected one of said drive gears, when said drive gear is driven in the opposite direction.

2. A change speed gearing, including, driving means, a plurality of drive gears each driven at a different speed by said driving means, a plurality of shift gears meshing with one another and having an input gear adapted to mesh with a selected one of said drive gears, said shift gears being mounted so that the forces due to the torque applied thereto by said driving means can keep said shift gears in mesh with each other and in mesh with the selected one of said drive gears, means for moving said input shift gear into and out of engagement with a selected one of said drive gears, and output means meshing with and driven by said train of shift gears.

3. Change speed gearing, including, a drive pinion forming the input to the gearing, a train of drive gears each driven at a different speed by said drive pinion, a train of shift gears having an input shift gear adapted to mesh with a selected one of said drive gears, said shift gears being mounted so that the forces due to the torque applied thereto by said drive pinion can keep said shift gears in mesh with each other and in mesh with the selected one of said drive gears, means for moving said input shift gear out of engagement with one of said drive gears and for moving said input shift gear in either direction into engagement with another one of said drive gears, and an output pinion meshing with the end of said train of shift gears and forming the output of said gearing.

4. A change speed gearing, including, driving means, a plurality of drive gears each driven at a different speed by said driving means, a plurality of shift gears meshing with each other and having an input gear adapted to mesh with a selected one of said drive gears, said shift gears being mounted so that the forces due to the torque applied thereto by said driving means can keep said shift gears in mesh with each other and in mesh with the selected one of said drive gears, means for moving said input shift gear into and out of engagement with a selected one of said drive gears, and output means meshing with and driven by said train of shift gears, said shift gears being mounted so that the forces due to the torque applied thereto by said output means, when said output means is rotated in the reverse direction to that in which it is normally driven, can keep said shift gears out of mesh with each other and out of mesh with the selected one of said drive gears.

5. Change speed gearing, including, a drive pinion forming the input to the gearing, a train of drive gears each driven at a different speed by said drive pinion, a train of shift gears having an input shift gear adapted to mesh with a selected one of said drive gears, said shift gears being mounted so that the forces due to the torque applied thereto by said drive pinion can keep said shift gears in mesh with each other and in mesh with the selected one of said drive gears, means for moving said input shift gear out of engagement with one of said drive gears and for moving said input shift gear in either direction into engagement with another one of said drive gears, and an output pinion meshing with the end of said train of shift gears and forming the output of said gearing, said shift gears being mounted so that the forces due to the torque applied thereto by said output pinion, when said output pinion is rotated in the direction opposite to that in which it is normally driven, can keep said shift gears out of mesh with each other and out of mesh with the selected one of said drive gears.

References Cited by the Examiner

UNITED STATES PATENTS

| | | | |
|---|---|---|---|
| 2,819,622 | 1/1938 | Haxton | 74—353 |
| 2,642,756 | 6/1953 | Cummings | 74—353 |

DON A. WHITE, *Primary Examiner.*